A. C. EDGAR.
VALVE MECHANISM FOR BIBS AND FAUCETS.
APPLICATION FILED NOV. 13, 1917.
1,284,076.
Patented Nov. 5, 1918.
2 SHEETS—SHEET 1.
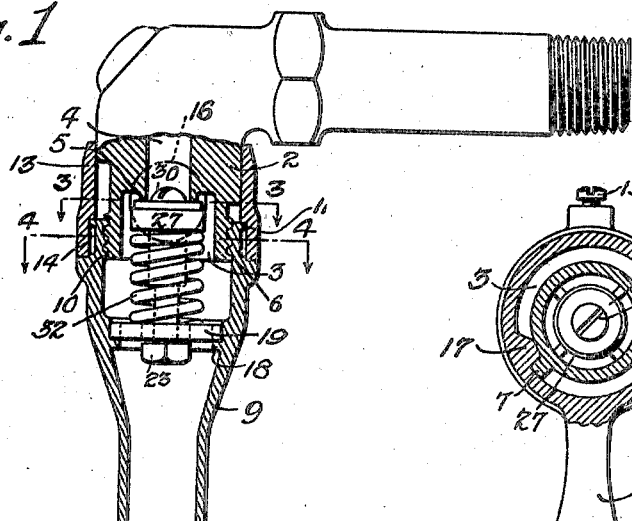
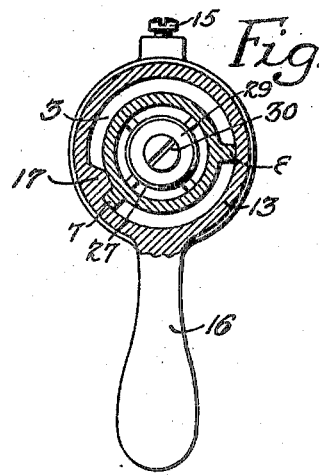
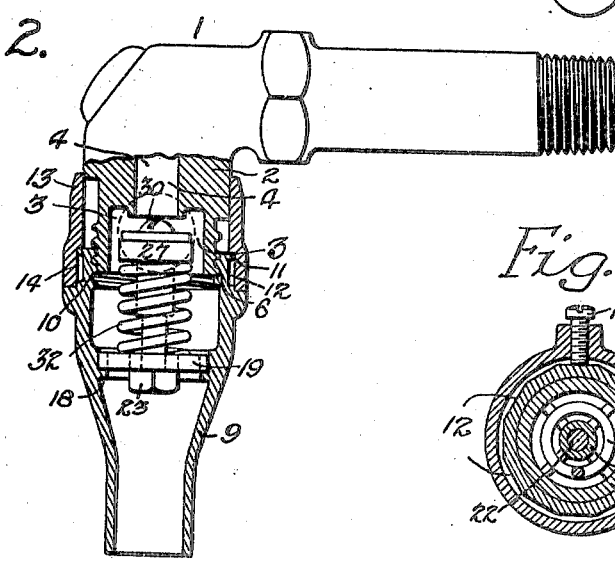
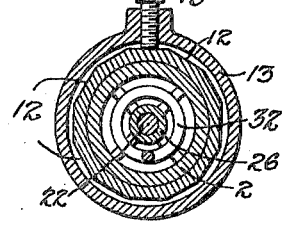
Witnesses,
E. E. Reichart
M. A. Inglas
Inventor,
Andrew C. Edgar
By Joshua R. H. Potts
his Attorney A. C. EDGAR.
VALVE MECHANISM FOR BIBS AND FAUCETS.
APPLICATION FILED NOV. 13, 1917.
1,284,076.
Patented Nov. 5, 1918.
2 SHEETS—SHEET 2.
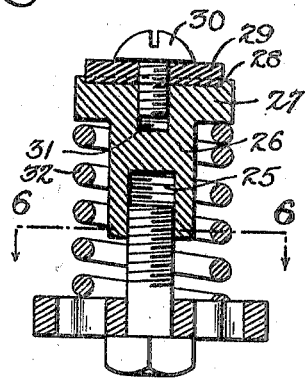
Fig. 5.
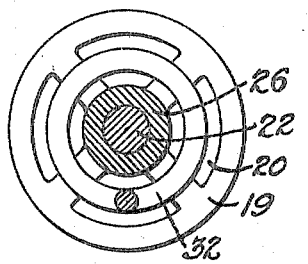
Fig. 6.
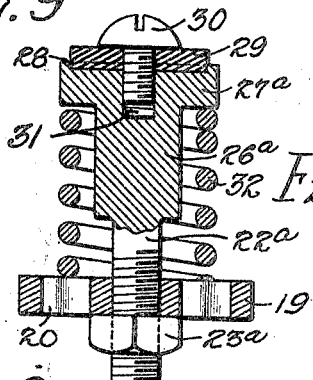
Fig. 9.
Fig. 7.
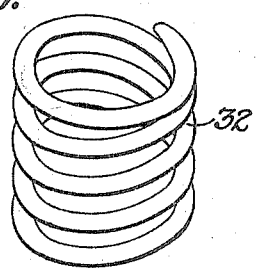
Fig. 8.
Witnesses,
E. E. Reichart
M. A. Inglar
Inventor,
Andrew C. Edgar
By Joshua R. H. Potts
his Attorney

UNITED STATES PATENT OFFICE.

ANDREW C. EDGAR, OF NEWTON SQUARE, PENNSYLVANIA.

VALVE MECHANISM FOR BIBS AND FAUCETS.

1,284,076.  Specification of Letters Patent.  Patented Nov. 5, 1918.

Application filed November 13, 1917. Serial No. 201,740.

*To all whom it may concern:*

Be it known that I, ANDREW C. EDGAR, a citizen of the United States, residing at Newton Square, in the county of Delaware and State of Pennsylvania, have invented certain new and useful Improvements in Valve Mechanism for Bibs and Faucets, of which the following is a specification.

It is well known that in water systems used in residences or other places where water meters are used, the plumbing system is "closed" and when the fire is started in the range the water-back of the range often bursts due to the creation of excess internal pressure in the pipes. This is particularly the case where the bibs or faucets in the house are tight and, therefore, there is no possible leakage to permit the escape of the excess pressure. Relief or safety valves are sometimes employed in the main pipes but due to the fact that the water in the system is used but comparatively little these main safety valves often stick and do not operate.

One object of my invention is to provide the faucets in such a system with valve mechanism which will open, due to excess pressure, and permit the escape thereof.

Another object of my invention is to so construct this valve mechanism that it may be easily and quickly repaired or replaced.

A further object is to so construct my invention that it can be cheaply manufactured and sold and will be durable in use.

These objects, and other advantageous ends which will be described hereinafter, I attain in the following manner, reference being had to the accompanying drawings, in which—

Figure 1 is an elevation of a bib provided with valve mechanism which is made in accordance with my invention, the view being shown partly in section and with the valve closed, Fig. 2 is a view of similar nature to Fig. 1 with the valve open, Fig. 3 is a transverse section taken on the line 3—3 of Fig. 1, Fig. 4 is a transverse section taken on the line 4—4 of Fig. 1, Fig. 5 is an enlarged sectional elevation of the movable valve members constructed in accordance with my invention, Fig. 6 is a transverse section taken on the line 6—6 of Fig. 5, Fig. 7 is a detached perspective view of certain of the elements shown in Fig. 5, Fig. 8 is a perspective view of the spring illustrated in Fig. 5, and Fig. 9 is a view of similar nature to Fig. 5 showing a modified form of certain of the elements thereof.

Referring to Figs. 1 to 8, inclusive, of the drawings, 1 represents a bib or faucet having a downturned end portion 2 which is recessed at 3, which recess communicates with the outlet passage 4. A valve seat 5 is provided within the recess 3 and surrounds the passage 4. The portion 2 is provided with an exterior screw-thread 6 and two lugs 7 and 8 which are spaced apart, as clearly shown in Fig. 3. A nozzle 9 at its upper end has an interior screw-thread 10 which is adapted to fit the screw-thread 6. The extreme upper end of the nozzle is provided with a flange 11 and below this flange and entirely surrounding the outer surface of the nozzle are a plurality of angularly disposed flat surfaces 12.

A sleeve 13 has a bottom portion 14 which surrounds the upper end of the nozzle 9 and has a set-screw 15 which can be turned into engagement with any of the angularly disposed flat surfaces 12, as clearly shown in Fig. 4. Thus the sleeve 13 is capable of being secured to the nozzle 9 in any of a number of circumferential positions. The sleeve 13 is provided with a handle 16 by which the latter can be rotated and the interior of said sleeve 13, at a position above the nozzle, is provided with a lug 17 which is designed to engage and be stopped by the lugs 7 and 8 when the sleeve 13 is turned through the medium of the handle 16.

Since the nozzle 9 is connected to the portion 2 of the bib 1 only through the engagement of the screw-threads 6 and 10, it will be noted that a rotatable movement of the handle, as above described, will cause the nozzle 9 to be rotated and also to be moved upwardly and downwardly through the action of the screw-threads.

The nozzle 9 is provided with an internal flange 18 which forms a seat for a disk 19. This disk, as clearly shown in Fig. 7, has a plurality of segmental perforations 20 and a central hole 21.

A screw 22 has an integral nut head 23. This screw is adapted to freely pass through the hole 21 in the disk 19 so that the nut head 23 engages the under surface of said disk. The upper threaded end 24 of the screw is adapted to engage a threaded opening 25 in a stem 26 of a head 27, as clearly shown in Fig. 5. The upper surface of the head 27 is dished or recessed, as shown at 28, and a washer 29, preferably of fiber or rubber, fits within the recess 28 and is secured by a screw 30, the latter engaging a threaded hole 31 in the head 27.

A coiled spring 32 is interposed between the bottom surface of the head 27 and the upper surface of the disk 19 and tends to move the nut head 23 against the under surface of the disk 19 and to move the head 27 and washer 29 upwardly away from said disk. The washer 29 is adapted to engage the valve seat 5, as clearly shown in Fig. 1, to close the outlet passage 4. However, by the rotation of the handle 16, the nozzle 9 will be lowered with respect to the portion 2 and the washer 29 will be moved downwardly and away from the valve seat 5 to permit water to flow out of the passage 4 and through the nozzle 9, this position being shown in Fig. 2.

If, when the valve is closed, as shown in Fig. 1, an excessive pressure is established within the outlet passage 4 due to the starting of a fire in the range, when that pressure exceeds the strength of the spring 32, the latter will be compressed between the head 27 and the disk 19 and the washer 29 will be forced away from its valve seat 5 and the pressure within the outlet passage 4 will be reduced since the excess pressure can escape through the disk 19 and nozzle 9.

My improved form of resilient valve mechanism is of particular advantage for the reason that it can be removed, as a unit, from the bib or faucet and can be used advantageously in the form of bib which is illustrated and considered one of the most practical bibs now on the market for the reason of its easy adjustment by the changing of the relative position between the setscrew 15 and the upper end of the nozzle 9. To remove the valve mechanism from the bib for repair or the renewal of the washer 29 it is merely necessary to loosen the screw 15 and to unscrew the nozzle 9 from the portion 2; the valve mechanism will thus be removed with the nozzle and can be lifted bodily from the nozzle, and if it is only necessary to renew the washer 29 the same can be done by the removal of the screw 30.

The spring 32 can be made in various strengths to suit different requirements or to permit the valve to open after a certain maximum pressure, within the outlet passage, has been reached. Another advantage of my invention is that it provides a resilient backing for the washer during the ordinary use of the faucet since the spring 32 will be slightly compressed due to the initial impact of the washer 29 with the valve seat 5, thus doing away with any abrupt or harsh setting of the valve.

In the form of my improved mechanism in Fig. 9, I adopt a construction involving the same principle described in connection with Figs. 1 to 8, inclusive, but instead of providing a screw with an integral nut, I provide a head 27$^a$ with an integral stem 26$^a$ and integral rod 22$^a$, the latter being screw-threaded and having a nut 23$^a$ thereon. In all other respects the construction is similar to that described in connection with Figs. 1 to 8, inclusive and I have, therefore, given similar parts corresponding reference numerals. In the construction shown in Fig. 9 the nut 23$^a$ is adapted to engage the lower surface of the disk 19.

It will be noted that in the form of my invention described in connection with Figs. 1 to 8, inclusive, the distance between the washer 29 and the disk 19 can be varied by turning the screw 22 within the threaded opening 25 so that an adjustment can be secured to properly position the several parts of the valve mechanism within the faucet. In the construction of Fig. 9 the adjustment can be attained by the turning of the nut 23$^a$ on the threaded rod 22$^a$. Furthermore, it will be understood that by using the construction above set forth, the spring pressure can be readily varied by turning the bolt 23, in the form of my invention shown in Figs. 1 to 7, inclusive, or by turning the nut 23$^a$ in the form of my invention shown in Fig. 9. Thus the device can be readily set to automatically open at different pressures. Also, the pressure of the spring can be varied by the turning of the nozzle 9 relatively to the portion 2.

While I have described my invention as taking a particular form, it will be understood that the various parts of my invention may be changed without departing from the spirit thereof, and hence I do not limit myself to the precise construction set forth, but consider that I am at liberty to make such changes and alterations as fairly come within the scope of the appended claims.

Having thus described my invention, what I claim as new and desire to secure by Letters Patent is:

1. In a device of the character described the combination of means having an outlet passage and a valve seat surrounding said passage; means providing a second seat; a perforated member adapted to engage said second seat and having a hole therein; a head; a washer on said head adapted to engage said valve seat; means slidably connected to said perforated member and joined to said head; and a spring interposed between said head and said member, said perforated member, head, washer, spring, and slidably connected means being located between said two seats whereby the spring will yield to permit the valve to be automatically moved from its seat when the fluid in the outlet passage reaches an unsafe pressure, substantially as described.

2. In a device of the character described the combination of means having an outlet passage and a valve seat surrounding said passage; means providing a second seat; a perforated member adapted to engage said second seat and having a hole therein; a head; a washer on said head adapted to engage said valve seat at a position between the latter and said second seat; means slidably connected to said perforated member and joined to said head; and a spring interposed between said head and said member; said slidable connection including a nut adapted to engage a surface of said perforated member which is remote from said head and thereby permit the perforated member, slidably connected means, head, spring, and washer to be freely removed and replaced as a unit, substantially as described.

3. In a device of the character described means providing a passageway and a valve seat surrounding said passageway; means providing a second seat; a perforated member adapted to rest upon said second seat and having a hole therein; a head having a washer thereon adapted to engage said valve seat; a threaded opening in said head; a screw slidable through said hole and adapted to engage said threaded opening and having a nut thereon for engagement with a surface of said perforated member which is remote from said head; and a coiled spring interposed between said head and perforated member and surrounding said screw, substantially as described.

4. In a device of the character described means providing a passage and a valve seat surrounding said passage; a nozzle having a seat therein; a perforated member for engagement with said seat and having a hole therein; said nozzle being movable relatively to said first means to cause a relative movement of the valve seat and said perforated member toward and from each other; a head; a washer on the head adapted to engage the valve seat; a threaded member freely slidable through the hole in said perforated member and having a nut for engagement with a surface of said perforated member which is remote from said head, said head having a threaded opening therein for engagement with said threaded member; and a spring interposed between said head and said perforated member, substantially as described.

In testimony whereof I have signed my name to this specification in the presence of two subscribing witnesses.

ANDREW C. EDGAR.

Witnesses:
MARY A. INGLAN,
CHAS. E. POTTS.